US010692236B2

(12) United States Patent
Barish et al.

(10) Patent No.: US 10,692,236 B2
(45) Date of Patent: Jun. 23, 2020

(54) CONTAINER USE ESTIMATION

(71) Applicant: SYMBOL TECHNOLOGIES, LLC, Lincolnshire, IL (US)

(72) Inventors: Justin F. Barish, Kings Park, NY (US); Adithya H. Krishnamurthy, Hicksville, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 148 days.

(21) Appl. No.: 15/853,223

(22) Filed: Dec. 22, 2017

(65) Prior Publication Data
US 2019/0197719 A1 Jun. 27, 2019

(51) Int. Cl.
*G06T 7/62* (2017.01)
*G06K 9/62* (2006.01)
*B65D 90/48* (2006.01)
*G06T 7/50* (2017.01)

(52) U.S. Cl.
CPC .............. *G06T 7/62* (2017.01); *B65D 90/48* (2013.01); *G06K 9/6212* (2013.01); *G06T 7/50* (2017.01); *G06T 2207/10028* (2013.01); *G06T 2207/30112* (2013.01); *G06T 2207/30268* (2013.01)

(58) Field of Classification Search
CPC ....... B65D 90/48; B65D 90/50; B65D 90/511
USPC .................... 382/154, 152, 100, 141–143
See application file for complete search history.

(56) References Cited

U.S. PATENT DOCUMENTS

| 7,813,540 | B1* | 10/2010 | Kraft | G01V 5/0016 |
| | | | | 378/57 |
| 9,460,524 | B1 | 10/2016 | Curlander et al. | |
| 9,704,044 | B1 | 7/2017 | Curlander et al. | |
| 2003/0036935 | A1 | 2/2003 | Nel | |
| 2006/0045323 | A1* | 3/2006 | Ateya | G06K 9/2027 |
| | | | | 382/141 |
| 2014/0175090 | A1 | 6/2014 | Bellehumeur et al. | |
| 2014/0372183 | A1 | 12/2014 | Groble et al. | |
| 2017/0132784 | A1* | 5/2017 | Yamada | G01B 11/25 |
| 2017/0140550 | A1 | 5/2017 | Zhang et al. | |
| 2017/0178333 | A1 | 6/2017 | Zhang et al. | |

OTHER PUBLICATIONS

International Search Report and Written Opinion for International Application No. PCT/US2018/059774 dated Jan. 22, 2019.

* cited by examiner

*Primary Examiner* — Dwayne D Bost
*Assistant Examiner* — Stephen M Brinich
(74) *Attorney, Agent, or Firm* — Yuri Astvatsaturov

(57) ABSTRACT

Embodiments of the present invention are generally directed to estimating capacity usage of a container. In an embodiment, the present invention is a method of estimating a fullness of a container. The method includes: mounting an image capture apparatus proximate a container-loading area, the image capture apparatus operable to capture three-dimensional images; capturing, via the image capture apparatus, a three-dimensional image representative of a three-dimensional formation, the three-dimensional image having a plurality of points with three-dimensional point data including depth data; generating a histogram of the depth data from the three-dimensional image; and estimating the fullness of the container based at least in part on the histogram.

11 Claims, 11 Drawing Sheets

CONTAINER USE ESTIMATION

BACKGROUND

Goods can be transported in many different ways using many different methods. Long-haul transportation in particular often employs containers which can be loaded with goods and thereafter moved by vehicles, trains, marine vessels, or airplanes to their desired destinations. While not always relying on detachable containers, short-haul goods transport similarly uses vehicles like delivery trucks/box trucks which have attached containers for storage of items and freight.

In the past, most loading or unloading of goods was performed without significant input from computerized systems. However, with the evolution of computing capabilities, the availability of sensed environmental data, and the ever-increasing focus on efficiency, today's loading and unloading procedures are monitored, supervised, and/or assisted by computing platforms that can act on information in an instance. One aspect that is of particular importance is the loading efficiency and being able to gauge how much of container space is wasted. For example, leaving large gaps between freight pieces could mean that the container is not filled to capacity. Likewise, not filling the container to the top as goods are loaded back to front also leaves valuable space vacant, creating inefficiency.

A particular problem could occur, though, when dealing with boxes and/or freight of certain dimensions and/or type like, for example, gaylord type boxes. Gaylord boxes are generally understood to be large or bulk-size boxes that are designed to carry one or more (often irregularly shaped) loads. This allows for the shipment of products in a large, single box or on a pallet. Though gaylord boxes can vary in size, they are generally relatively tall preventing the ability to effectively stack such boxes close to the ceiling of a containers. For example, if a gaylord box is 4 feet tall and less than 4 feet remains to the ceiling of a container, no additional gaylords may be stacked on top and the space above the gaylord may be wasted. In other situations, gaylord boxes may remain open, preventing the stacking of other boxes/freight thereon. Consequently, a large space above the gaylord may remain open and could affect automated container loading analytics. Similar issues could occur with other large or irregularly shaped freight/goods.

Accordingly, there exists a need for improved means of detecting and reporting container space use.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
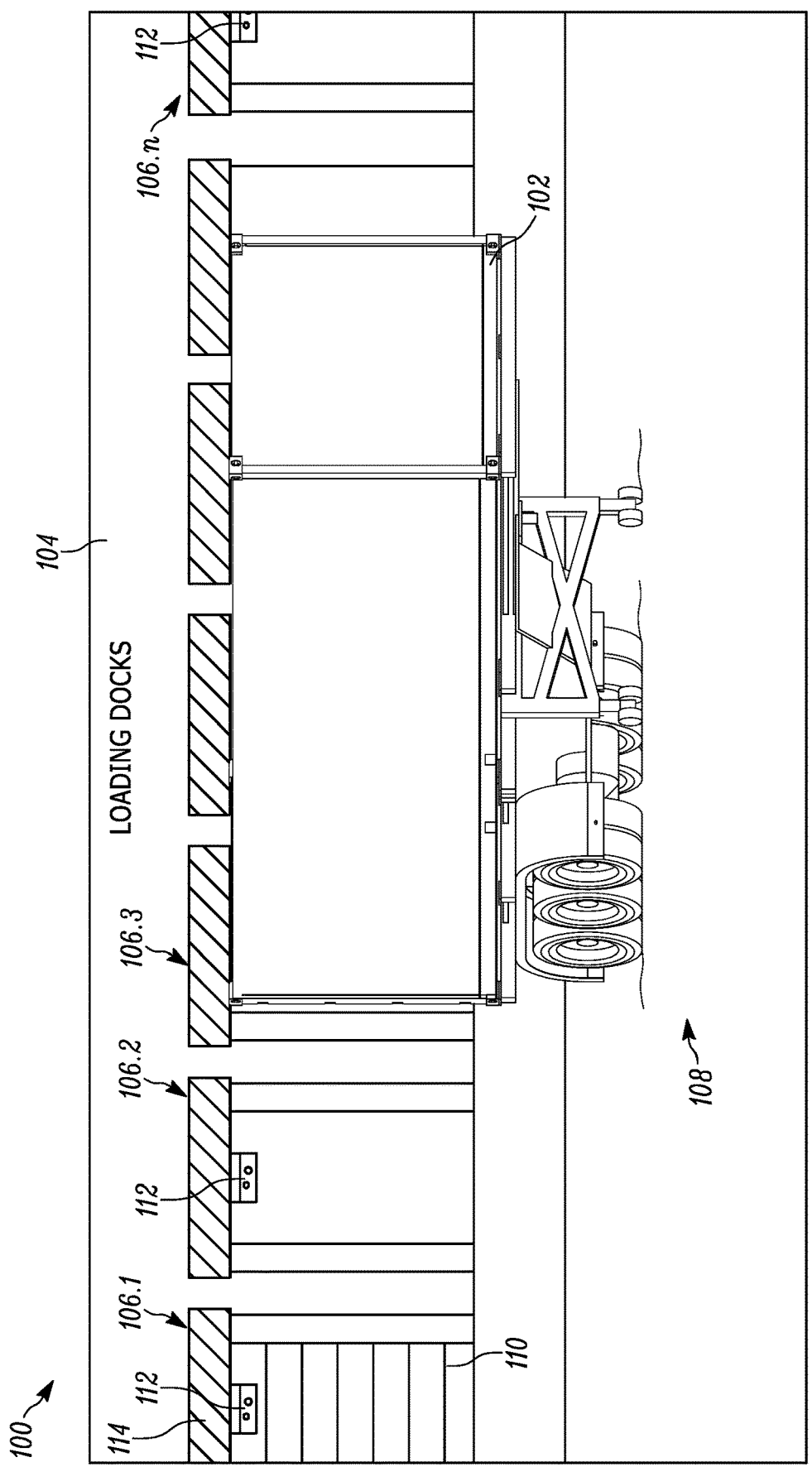
FIG. 1 illustrates a loading facility in accordance with an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As used herein, the term "container" shall refer to any container transportable by at least one of a vehicle, a train, a marine vessel, and airplane, and configured to store transportable goods such as boxed and/or unboxed items and/or other types of freight. Accordingly, example of a container includes an enclosed container fixedly attached to a platform with wheels and a hitch for towing by a powered vehicle. An example of a container also includes an enclosed container removably attached to a platform with wheels and a hitch for towing by a powered vehicle. An example of a container also includes an enclosure that is fixedly attached to a frame of a powered vehicle, such as the case may be with a delivery truck, box truck, etc. As such, while the exemplary embodiment(s) described below may appear to reference one kind of a container, the scope of the invention shall extend to other kinds of containers, as defined above.

In an embodiment, the present invention is a method of estimating a fullness of a container. The method includes: mounting an image capture apparatus proximate a container-loading area, the image capture apparatus operable to capture three-dimensional images; capturing, via the image capture apparatus, a three-dimensional image representative of a three-dimensional formation, the three-dimensional image having a plurality of points with three-dimensional point data including depth data; generating a histogram of the depth data from the three-dimensional image; and estimating the fullness of the container based at least in part on the histogram.

In another embodiment, the present invention is a system for analyzing a loading a loading of a container. The system includes: a container monitoring unit (CMU) mounted proximate a loading bay, the CMU including: a housing; an imaging assembly at least partially within the housing and operable to capture a three-dimensional image representative of a three-dimensional formation, the three-dimensional image having a plurality of points with three-dimensional point data including depth data; and a CMU controller communicatively connected to the imaging assembly, the controller operable to transmit the three-dimensional point data. The system also includes a host computer communicatively connected to the CMU, the host computer including a host computer controller operable to: receive the three-dimensional point data from the CMU controller; generate a histogram of the depth data from the three-dimensional point data; and estimate a first fullness of the container based at least in part on the histogram.

In still another embodiment, the present invention is CMU for analyzing capacity of a container. The CMU includes: a housing; an imaging assembly at least partially within the housing and operable to capture a three-dimensional image representative of a three-dimensional formation, the three-dimensional image having a plurality of points with three-dimensional point data including depth data; and a CMU controller communicatively connected to the imaging assembly. The controller is operable to: generate a histogram of the depth data from at least a portion of the three-dimensional point data; and estimate a fullness of the container, based at least in part on the histogram, via a histogram average-based calculation.

Referring now to the drawings, FIG. 1 illustrates an exemplary environment where embodiments of the present invention may be implemented. In the present example, the environment is provided in a form of a loading dock 100 (also referred to as a loading facility) where containers 102 are loaded with various goods and/or where various goods are unloaded from the containers 102. The loading dock 100 is comprised of a facility 104 having a plurality of loading bays 106.1-106.n facing a loading facility lot 108 where vehicles, such as semis (not shown), deliver and pick up containers 102. To be loaded, each container 102 is backed toward the facility 104 such that it is generally perpendicular with the wall having the loading bays 106, and in line with one of the loading bays (in this case 106.3). As illustrated, each loading bay 106 includes a bay door 110 that can be lowered to close the respective loading bay 106 or raised to open the respective loading bay allowing the interior of the facility 104 to be accessible therethrough. Additionally, each loading bay 106 is provided with a container monitoring unit (CMU) 112. The CMU is mounted near the container loading area, preferably in the upper section of the loading bay 106 outside the door 110 facing the loading facility lot 108 or an interior/rear of a container 102 if one is docked at the respective loading bay. To protect the CMU from inclement weather, it could be mounted under a bay awning 114. Once docked, goods can be loaded onto/unloaded from the container 102 with the CMU 112 maintaining a view of the rear/inside of the container.

Figure 2:
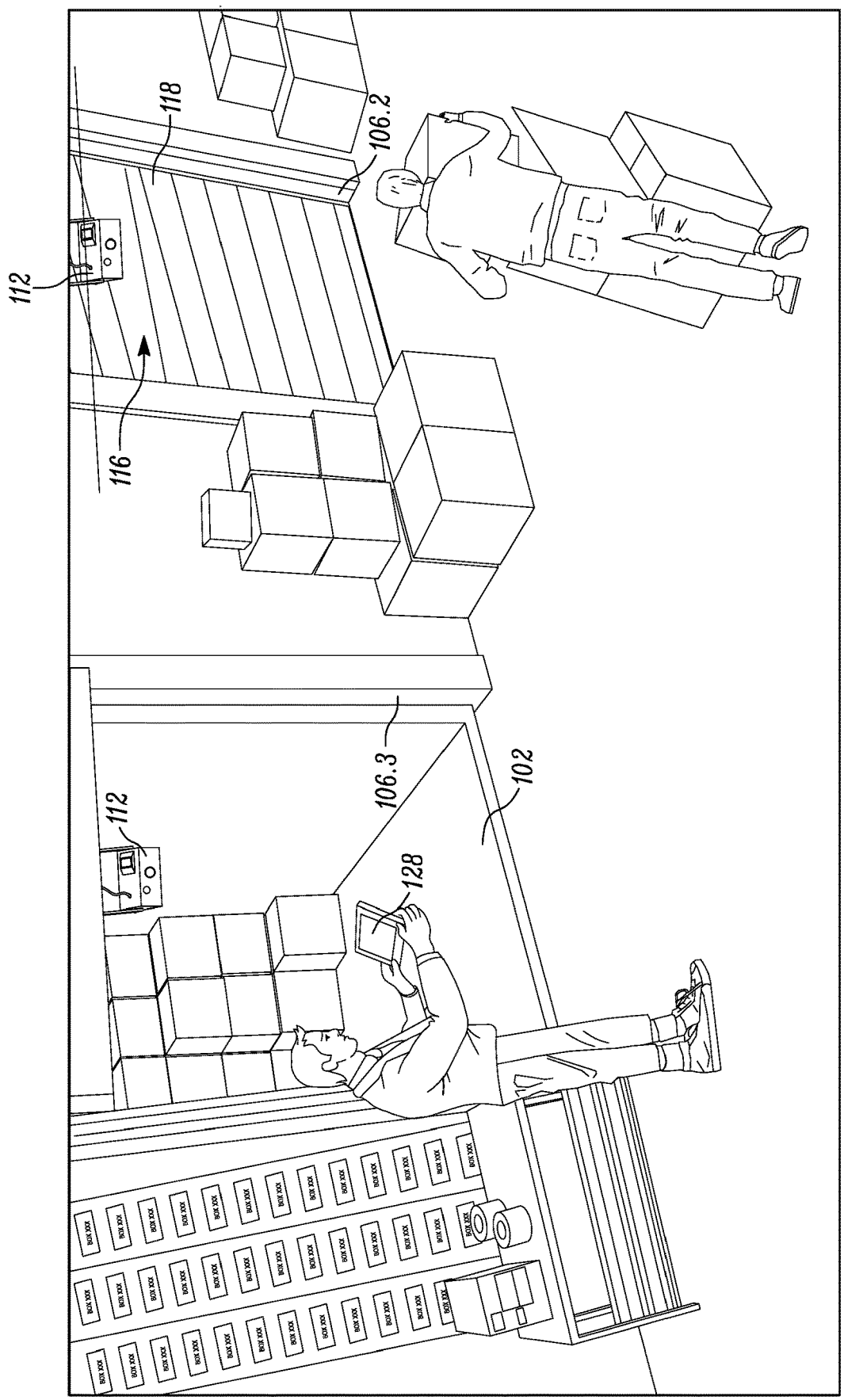
FIG. 2 illustrates an interior of the loading facility of FIG. 1.

FIG. 2 is an exemplary perspective view of the loading facility 104 of FIG. 1, as seen from the inside, depicting container 102 docked at a loading bay 106.3 with an open container door and container 116 docked at a loading bay 163.2 with a closed container 118. To help determine the status of the container door, the CMU 112 is employed, as described further below.

Figure 3:
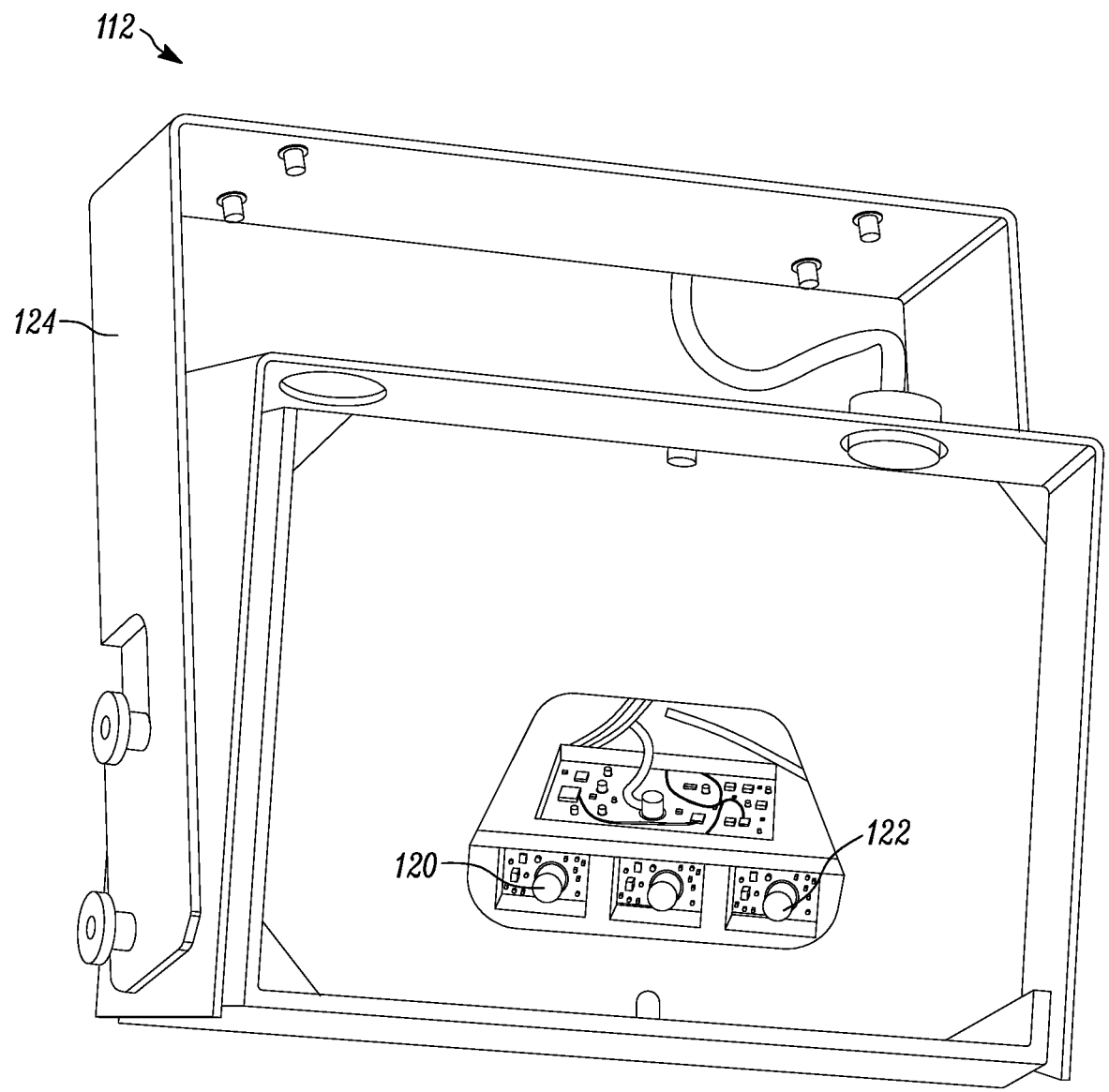
FIG. 3 illustrates a container monitoring unit in accordance with an embodiment of the present invention.

In the currently described embodiment and as shown in FIG. 3, the CMU 112 is a mountable device that includes a 3D-depth camera 120 for capturing 3D (three dimensional) images (e.g., 3D image data comprised of a plurality of points with three-dimensional point data) and a 2D camera 122 for capturing 2D images (e.g., 2D image data). The 2D camera may be an RGB (red, green, blue) camera for capturing 2D images. The CMU 112 also includes one or more processors and one or more computer memories for storing image data, and/or for executing application/instructions that perform analytics or other functions as described herein. For example, the CMU 112 may include flash memory used for determining, storing, or otherwise processing the imaging data and/or post-scanning data. In addition, CMU 112 may further include a network interface to enable communication with other devices (such as server 130). The network interface of CMU 112 may include any suitable type of communication interface(s) (e.g., wired and/or wireless interfaces) configured to operate in accordance with any suitable protocol(s). In various embodiments, and as shown in FIGS. 1 and 2, the CMU 112 is mounted via a mounting bracket 124 and oriented in the direction of docked containers to capture 3D and/or 2D image data of the interior and exterior thereof.

In an embodiment, to capture 3D image data, the 3D depth camera 120 includes an Infra-Red (IR) projector and a related IR camera. The IR projector projects a pattern of IR light or beams onto an object or surface, which may include surfaces of the container 102 (like the door, walls, floor, etc.), objects within the interior of the container (like boxes, packages, temporary shipping equipment, etc.), and/or surfaces of the loading facility lot 108 (like the surface of the loading facility lot on which the containers are parked). The IR light or beams may be distributed on the object or surface in a pattern of dots or points by the IR projector, which may be sensed or scanned by the IR camera. A depth-detection application, such as a depth-detection application executing on the one or more processors or memories of CMU 112, can determine, based on the pattern of dots or points, various depth values, for example, depth values of the interior of the container 102. For example, a near-depth object (e.g., nearby boxes, packages, etc.) may be determined where the dots or points are dense, and distant-depth objects (e.g., far boxes, packages, etc.) may be determined where the points are more spread out. The various depth values may be used by the depth-detection application and/or CMU 112 to generate a depth map. The depth map may represent a 3D image of, or contain 3D image data of, the objects or surfaces that were sensed or scanned by the 3D-depth camera 120.

Additionally, in an embodiment, to capture 2D image data, the 2D camera 122 includes an RGB (red, green, blue) based camera for capturing 2D images having RGB-based pixel data. In some embodiments, the 2D camera 122 captures 2D images, and related 2D image data, at the same or similar point in time as the 3D-depth camera 120 such that the CMU 112 can have both sets of 3D image data and 2D image data available for a particular surface, object, or scene at the same or similar instance in time.

Figure 4A:
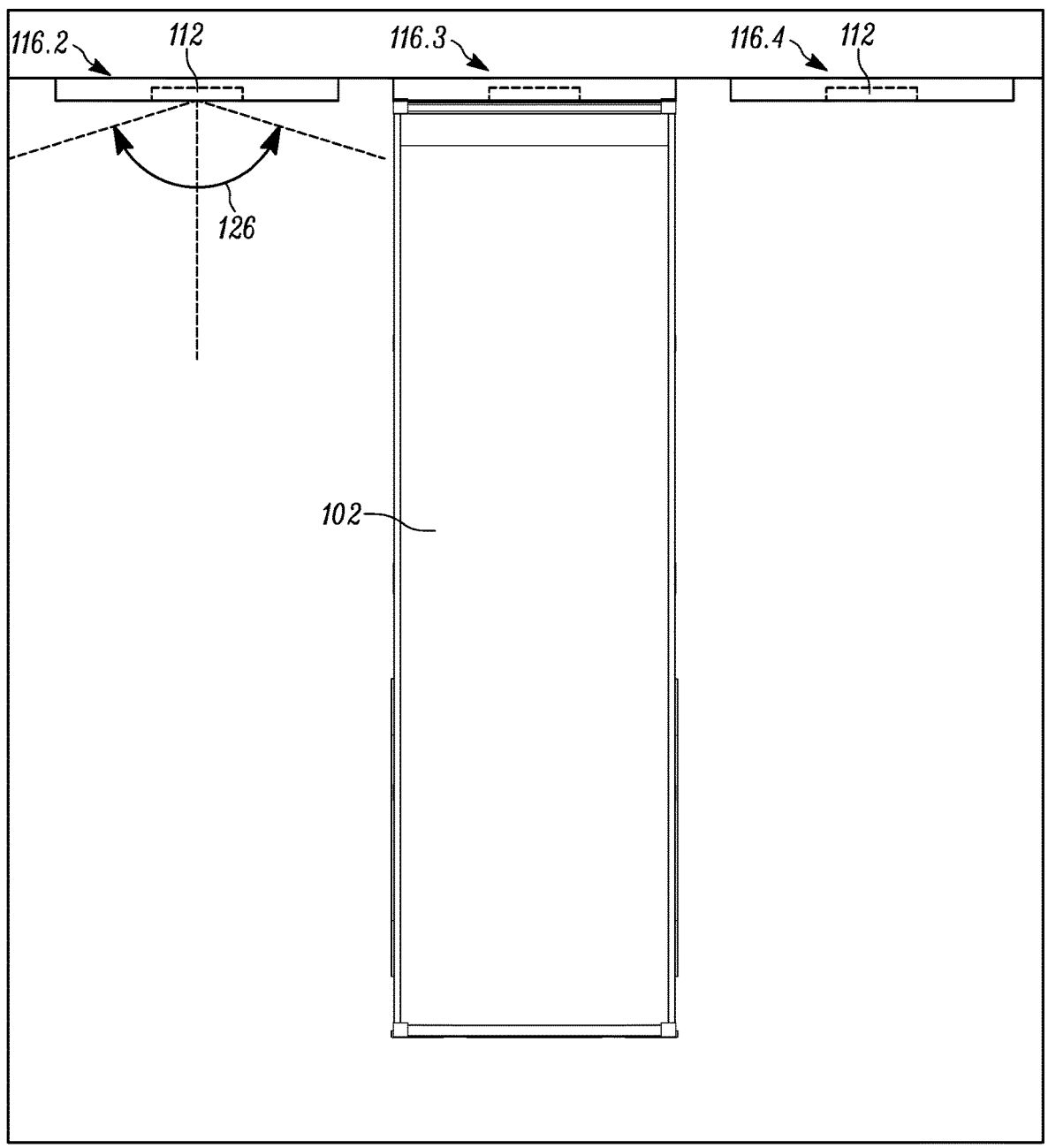
FIG. 4A illustrates a top-down view of the loading facility of FIG. 1 showing an exemplary field of view of a container monitoring unit.
Figure 4B:
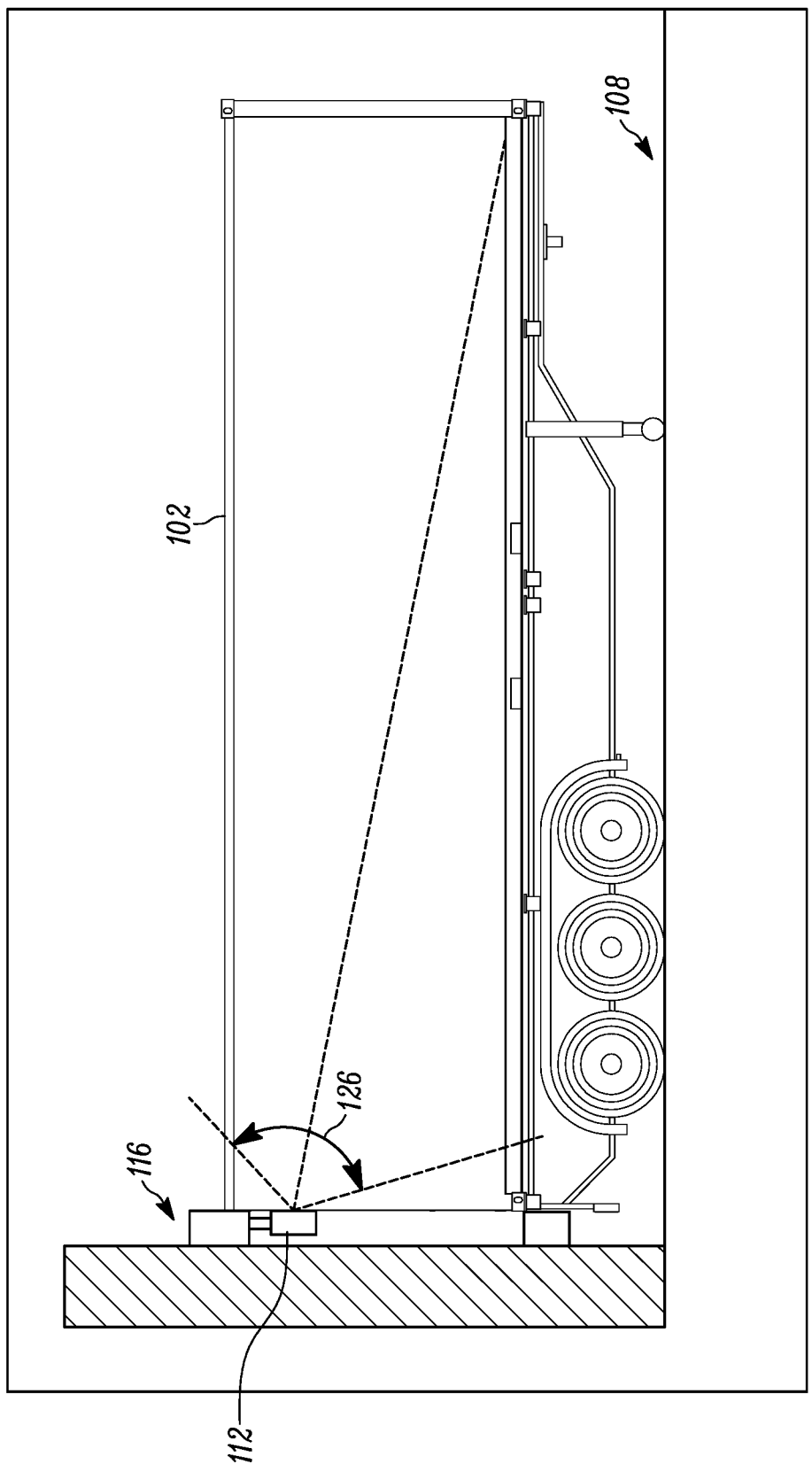
FIG. 4B illustrates a side view of the loading facility of FIG. 1 showing an exemplary field of view of a container monitoring unit.

Referring to FIGS. 4A and 4B, the CMU can be oriented such that its fields of view (FsOV) 126 for the 3D camera and the 2D camera expand to capture a majority of the interior of the container. Additionally, both FsOV can substantially overlap to capture data over substantially the same area. As a result, the CMU 112 can scan, sense, or otherwise capture image data from the walls, floor, ceiling, packages, or other objects or surfaces within the container to determine the 3D and 2D image data. Similarly, when a container is absent from the loading bay, the CMU can scan, sense, or otherwise capture image data from the loading facility lot 108 surface to determine the 3D and 2D image data. The image data may be processed by the one or more processors and/or memories of the CMU 112 (or, in some embodiments, one or more remote processors and/or memories of a server) to implement analysis, functions, such as graphical or imaging analytics, as described by the one or more various flowcharts, block diagrams, methods, functions, or various embodiments herein.

Figure 5:
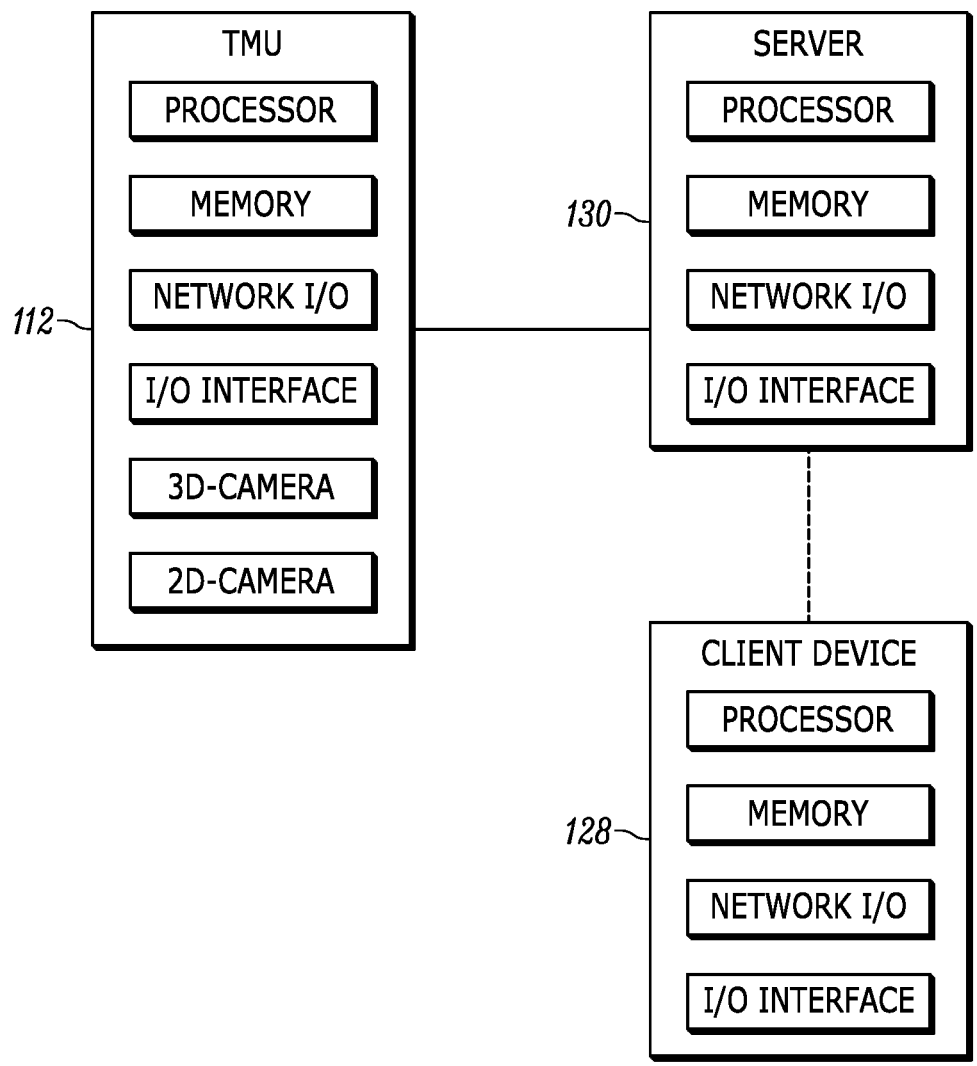
FIG. 5 illustrates an exemplary block diagram schematic of a communication network implemented in the facility of FIG. 1.

In some embodiments, the CMU 112 processes the 3D and 2D image data for use by other devices (e.g., client device 128 (which can be in a form of a mobile device, such as a tablet, smartphone, laptop, or other such mobile computing device), or server 130 (which can be in a form of a single or multiple computers operating to manage access to a centralized resource or service in a network)). The processing of the image data may generate post-scanning data that may include metadata, simplified data, normalized data, result data, status data, or alert data as determined from the original scanned or sensed image data. As shown in FIG. 5, which illustrates a block connection diagram between the CMU 112, server 130, and client device 128, these devices may be connected via any suitable communication means, including wired and/or wireless connectivity components that implement one or more communication protocol standards like, for example, TCP/IP, WiFi (802.11b), Bluetooth, Ethernet, or any other suitable communication protocols or standards.

In some embodiments, the server 130 may be located in the same loading facility 104. In other embodiments, server 130 may be located at a remote location, such as on a cloud-platform or other remote location. In still other embodiments, server 130 may be formed of a combination of local and cloud-based computers.

Server 130 is configured to execute computer instructions to perform operations associated with the systems and methods as described herein. The server 130 may implement enterprise service software that may include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used.

To assist with the reporting of space usage, the aforementioned components may be used, alone or in combination, to detect and/or provide various measurements of the interior of the container docked at a loading bay and use those measurements (i.e., data) to conduct the necessary analytics.

Figure 6:
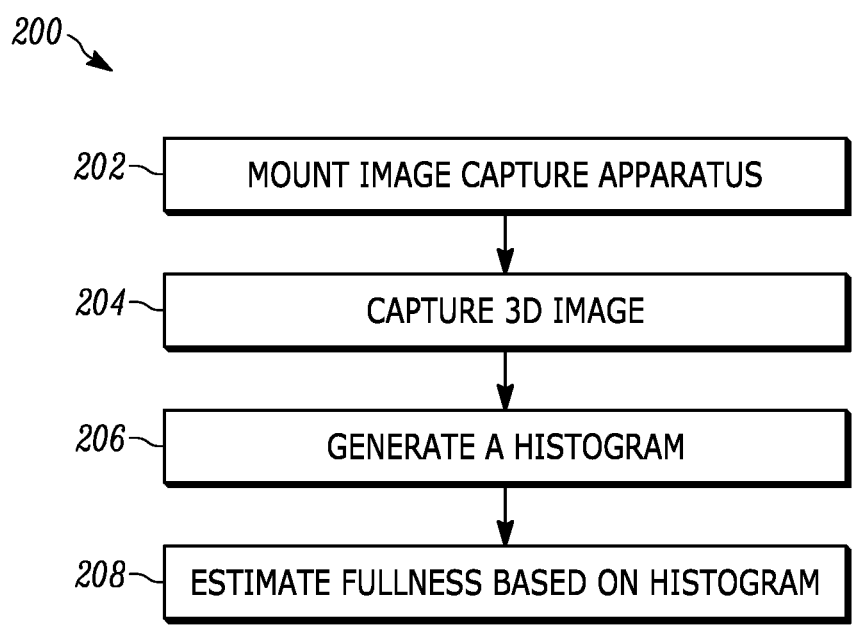
FIG. 6, illustrates a flowchart representative of a method of detecting the fullness of a container in accordance with an embodiment of the present invention.

Referring to FIG. 6, shown therein is a flowchart representative of an exemplary method 200 of estimating a fullness of a container. In step 202, the method includes the operation of mounting an image capture apparatus proximate a container-loading area, where the image capture apparatus is operable to capture three-dimensional images. The image capture apparatus can be implemented via the CMU 112 that is configured to capture 3D images. It is preferable to oriented the image capture apparatus such that its 3D FOV extend into the area of the loading facility lot, and more specifically, into the area where a container (such as container 102) is expected to be positioned during loading and unloading procedures. This configuration allows the image capture apparatus to sense (by capturing and analyzing 3D data) the presence or absence of various objects in the vicinity of its FOV, and make various determinations based thereon.

Next in step 204, the method includes the operation of capturing, via the image capture apparatus, a three-dimensional image representative of a three-dimensional formation, the three-dimensional image having a plurality of points with three-dimensional point data including depth data. In an embodiment, the 3D camera of the image capture apparatus senses the depth of all the points within its FOV and assigns various depth values thereto, building, what can be referred to as, a point cloud representative of the environment within its FOV. Further to the depth measurements, the image capture apparatus can assign horizontal and vertical position data to each of the points, creating three-dimensional point data for each of the points captures. In some cases, the image capture apparatus may not be able to sense anything in at least some portions of its FOV. This can occur if, for example, some part of the environment is out of the depth detection range of the image capture apparatus, or if, in case of using an IR-based 3D camera, there is a problem with sensing IR reflections. In this case, three-dimensional point data associated with points that cannot be sensed can include data representative of a lack of an object or a non-presence of 3D data (which can be interpreted as an absence of a detectable object).

It has been recognized that by evaluating the 3D image, it may be possible to infer space usage within the container. In some implementations, this can be done by evaluating the depth values of at least some of the points captured in the 3D image and correlating those values to fullness levels, as described further below.

Figure 7A:
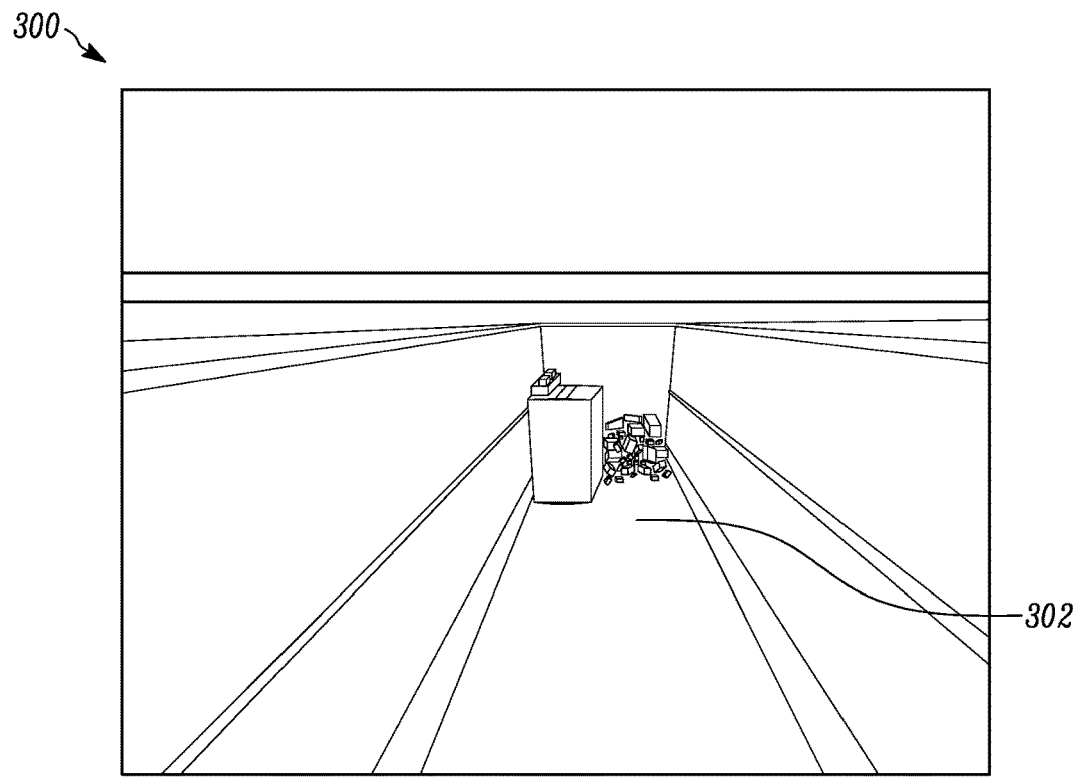
FIGS. 7A and 7B illustrate examples of a partially loaded container.
Figure 7B:
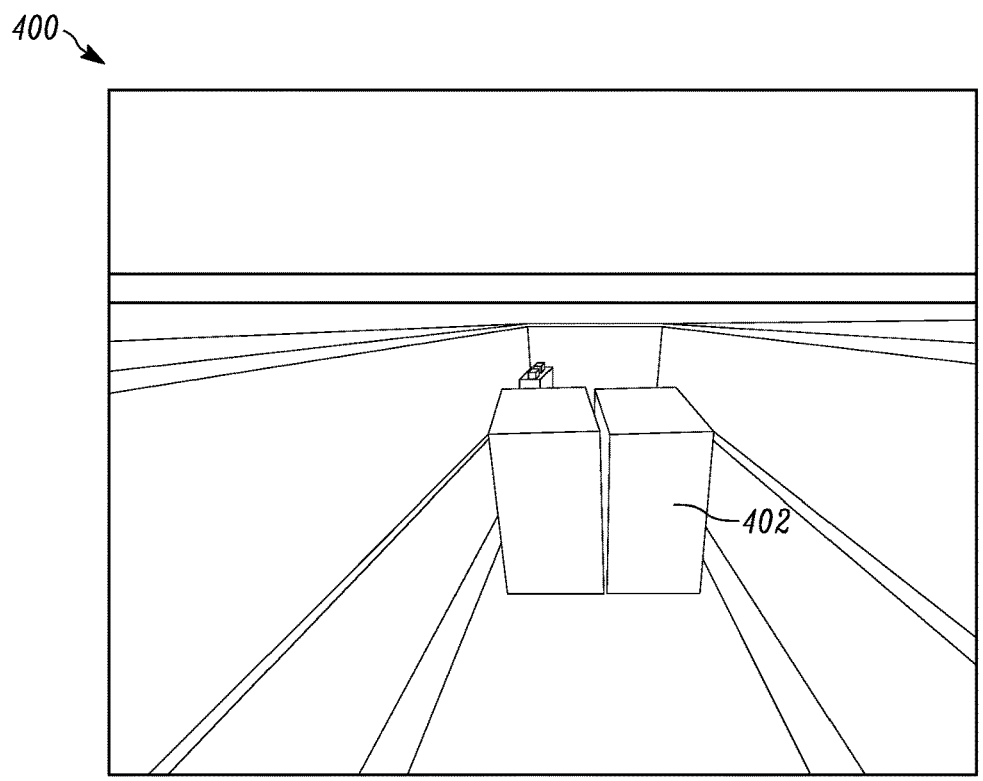

The actual computational analysis can take place on a server, such as the server 130, which receives the three-dimensional point data from the image capture apparatus, the image capture apparatus itself, or a combination thereof. Upon receiving/obtaining the three-dimensional point data, which includes the depth data, in step 206 the method 200 includes the operation of generating a histogram of the depth data. In generating the depth histogram, it is preferable to select points within the three-dimensional image that represent either the rear wall of the container or the surfaces of the goods that are present in the container. This is important because while the FOV of the 3d camera remains static, surfaces that generate 3D point data that contributes to internal space usage are dynamic. To explain further, one may refer to FIGS. 7A and 7B. FIG. 7A illustrates an image 300 of an interior of a container where point 302 is representative of a point on the floor of the container, and thus its depth value has no particular effect on the interior space usage. On the other hand, a point 402 (that is located in the same direction as point 302) in the image 400 of FIG. 7B is occupied by a surface of a box 404 that does have an effect on the interior space usage. Consequently, some embodiments, points that are used for histogram generation are taken from surfaces that are substantially parallel to a loading door of the container near where the image capture apparatus is located. Also, in some embodiments, points that are used for histogram generation are taken from surfaces which are within 30 degrees of being normal to a line extending from any point on the plane to the image capture apparatus. By limiting the points for the histogram in these or other manners, the histogram can represent a distribution of depth values of points that correspond to items that have some effect on the overall used and remaining capacities.

The determination of a planar surface itself can be performed via 3D imaging segmentation analysis. In some embodiments, sample consensus (SAC) segmentation analysis may be used to determine points in the 3D image data that correspond to different planes or surfaces. This can be applied to a wide variety of surfaces, including interior and exterior surfaces of the container (e.g., internal walls, floor, ceiling, and external surfaces like the exterior side of the door) and also surfaces of objects located within the container itself. SAC segmentation analysis determines, or segments, the different planes or surfaces of the environment into x, y, z coordinate planes by identifying a correlation of common points along x, y, z planes oriented within the 3D image data. As such, this method may be used to analyze points within the 3D image and identify a presence of planes that correspond to various surfaces. Additionally, examination of orientation of the planes (and thus the detected surfaces) can be performed to limit the points considered for the histogram. For instance, planes of interest may be limited to those which have a maximum $\Delta z$ for a given $x_1$, $x_2$ or a given $y_1$, $y_2$.

Figure 8:
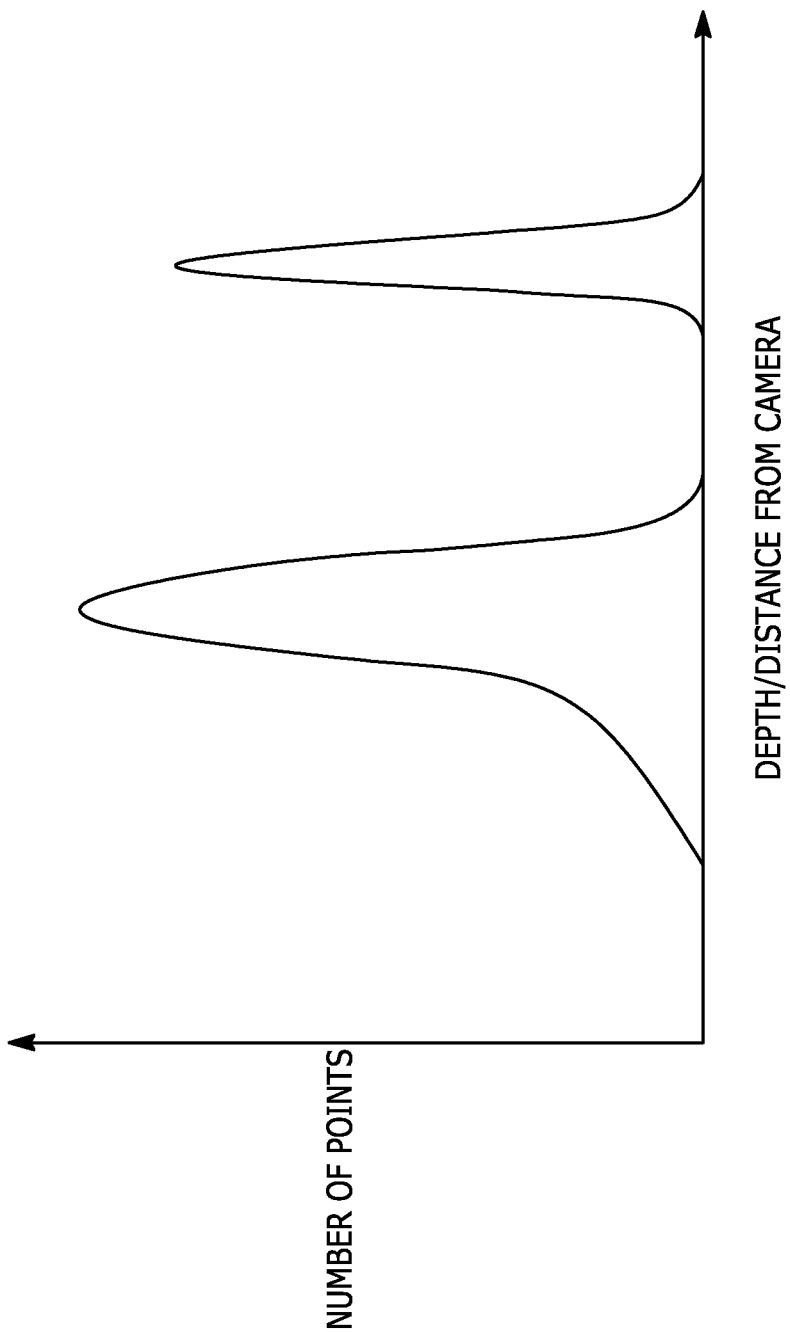
FIG. 8 illustrates a depth value histogram of a portion of FIG. 7B.

Upon obtaining the appropriate histogram, further analytics can be performed thereon to provide usage estimations. Referring to FIG. 8, shown there is a histogram of depth values associated with the FIG. of 7B. From this data, one may estimate the fullness of the container by computing an average depth value from the histogram and comparing the average value against a plurality of depth values each associated with a respective level of fullness of the container. This operation can be performed by, for example, the server in step 208 of the method 200. Computing the average depth value of the histogram of FIG. 8 yields a value which can then be used to determine the estimated fullness of the container. In an implementation, this is done by looking up what fullness amount correspond to the average depth value in a lookup table. In another implementation, this computation further depends on the overall dimensions of the container (at least one of a height, a width, and a depth of the container) since an average depth value of W from the image capture device will signify an amount of fullness that varies as a result of the overall area that can be filled.

Figure 9:
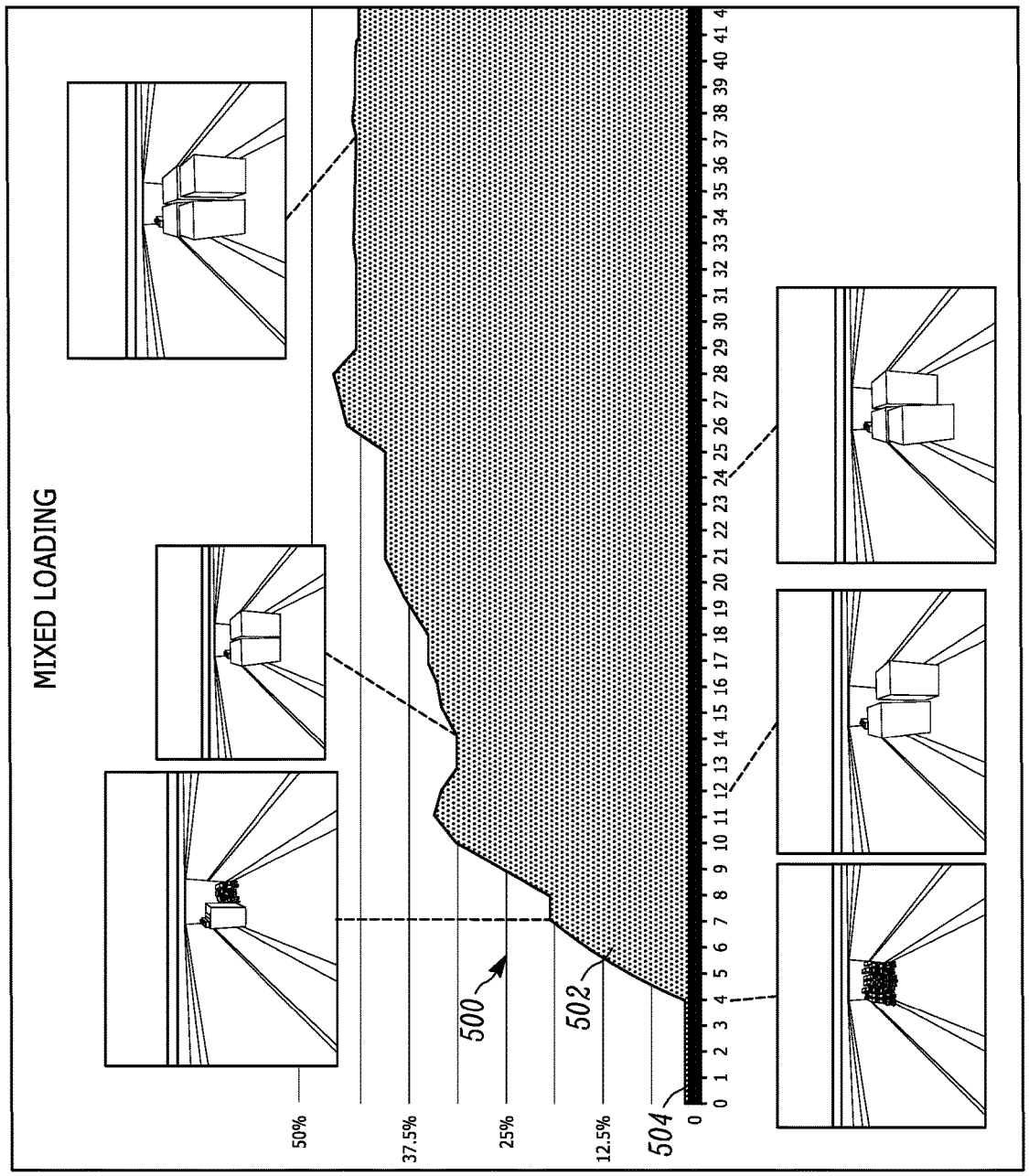
FIG. 9 illustrates a graph representative of container fullness calculated via a histogram average-based method and via a histogram peak-based method during various stages of loading a container in accordance with an embodiment of the present invention.

While the above-embodiments have been described in terms of estimating fullness by computing average depth values from the histogram (also referred to as "histogram average-based method(s)"), in other implementations fullness may be determined by histogram peak selection and evaluation (also referred to as "histogram peak-based method(s)"). In an exemplary histogram peak-based method, the determination of fullness includes identifying, from the generated histogram, a first plurality of histogram peaks falling within a threshold percentage of a highest histogram peak, identifying a peak from the first plurality of histogram peaks having a furthest distance value from the CMU, and using the further distance in determining the fullness. In an implementation, the determination of fullness is performed by comparing the furthest distance value against a plurality of distance values each associated with a respective level of fullness of the container. In another implementation, the furthest distance is converted into a percentage of the total container depth and then subtracted from 100% providing a percentage of the container that is estimated to be filled. Since the histogram average-based method and the histogram peak-based method rely on different aspects of the histogram, they will often output different fullness values. For example, referring to the graph 500 of FIG. 9, unlike the container fullness 502 estimated via a histogram average-based method, the container fullness 504 estimated via the histogram peak-based method remains at or near 0% despite boxes being loaded into the container. This occurs because the rear wall of the container (above all the loaded boxes) remains within the view of the camera. Due to the size of this wall, it will register as a relatively tall peak on the histogram and, assuming a sufficient threshold, will be selected for determining the fullness.

Figure 10:
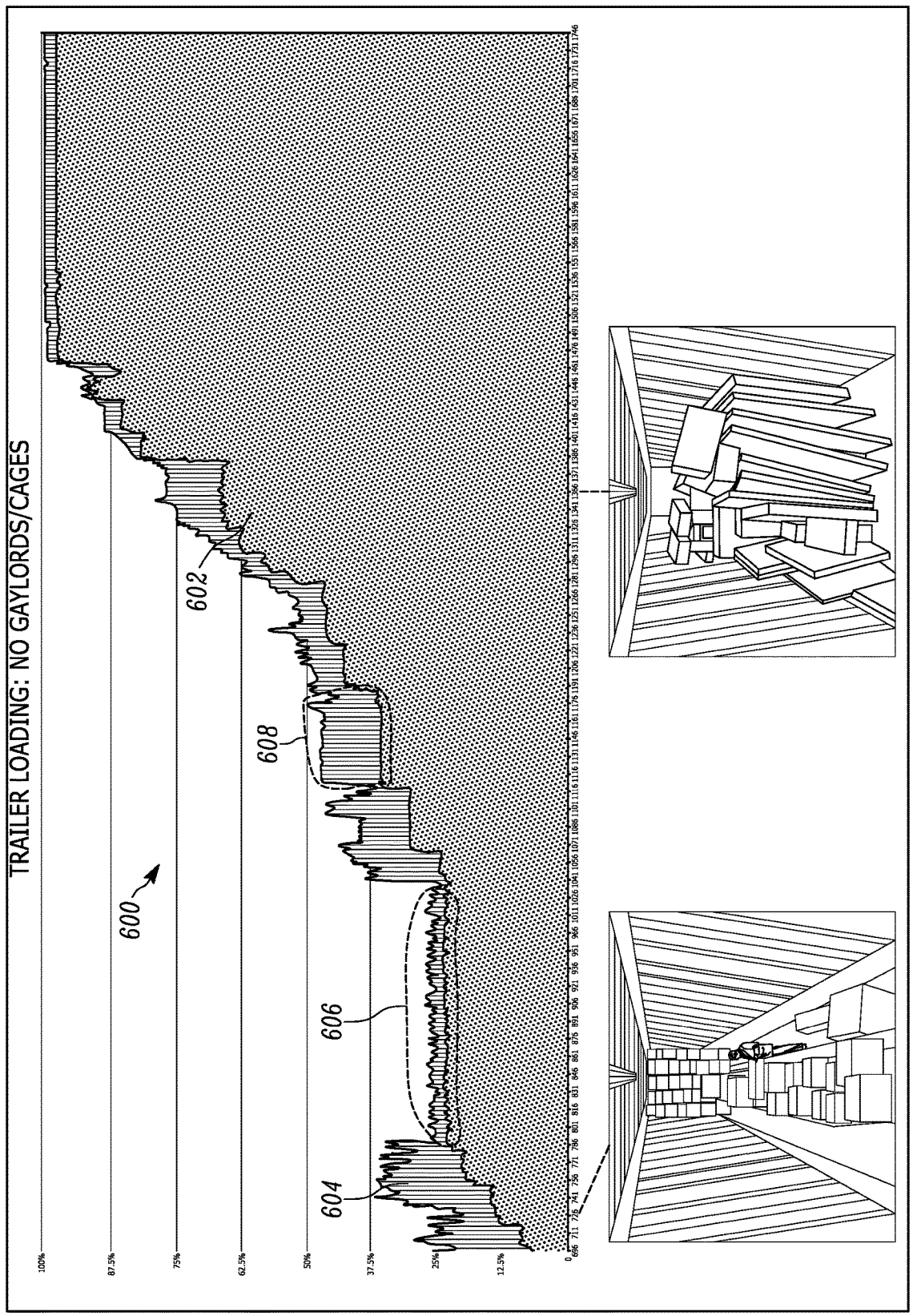
FIG. 10 illustrates a graph representative of container fullness calculated via a histogram average-based method and via a histogram peak-based method during various stages of loading a container in accordance with an embodiment of the present invention.

Although estimates determined by the histogram peak-based method(s) may not appear as accurate, their advantage becomes more notable when combined with estimates determined by the histogram average-based method(s). For example, using both method may assist one in determining whether mixed loading (loading of gaylord and/or gaylord-like boxes and/or freight) has occurred. When mixed loading occurs, as illustrates in FIG. 9, the container fullness metric obtained via a histogram peak-based method is likely to remain at a relatively low value while the container fullness metric obtained via a histogram average-based method is likely to increase. On the other hand, as shown in the graph 600 of FIG. 10, when mixed loading does not occur, the container fullness metric 602 obtained via a histogram peak-based method and the container fullness metric 604 obtained via a histogram average-based method repeatedly converge and diverge throughout the loading process. In an embodiment, convergence may be viewed as being within 10% of the overall load amount and divergence may be viewed as being above 10% of the overall load amount. In graph 600, convergence can be seen to occur in, for example, region 606 and divergence can be seen to occur in, for example, region 608. Based on this, a determination of mixed loading can be made when the fullness of the container estimated by the histogram peak-based method and the fullness of the container estimated by the histogram average-based method diverge and converge, and a determination of no mixed loading can be made when the fullness of the container estimated by the histogram peak-based method and the fullness of the container estimated by the histogram average-based method diverge and do not re-converge.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations. Moreover, no steps of any method disclosed herein shall be understood to have any specific order unless it is expressly stated that no other order is possible or required by the remaining steps of the respective method.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system for analyzing capacity of a container bound by a floor, a ceiling, a first upright wall, a second upright wall, and a third upright wall, the first upright wall being opposite of and parallel to the second upright wall, the third upright wall being perpendicular to the first upright wall and to the second upright wall, the system comprising:
   a container monitoring unit (CMU) mounted proximate a loading bay, the CMU including:
      a housing;
      an imaging assembly at least partially within the housing and operable to capture a three-dimensional image representative of a three-dimensional formation, the three-dimensional image having a plurality of points with three-dimensional point data including depth data; and
      a CMU controller communicatively connected to the imaging assembly, the controller operable to transmit the three-dimensional point data; and
   a host computer communicatively connected to the CMU, the host computer including a host computer controller operable to:
      receive the three-dimensional point data from the CMU controller;
      generate a histogram of the depth data from at least a portion of the three-dimensional point data;
      estimate a first fullness of the container by computing an average depth value from the histogram and basing the first fullness at least in part on the average depth value;
      estimate a second fullness of the container by identifying a first plurality of histogram peaks falling within a threshold percentage of a highest histogram peak, identifying a peak from the first plurality of histogram peaks having a furthest distance value from the CMU, and basing the second fullness of the container at least in part on the furthest distance value;
      provide an indication of mixed loading when, upon the container being loaded, the first fullness of the container and the second fullness of the container diverge and converge, along at least a portion of the container; and
      provide an indication of no mixed loading when, upon the container being loaded, the first fullness of the container and the second fullness of the container diverge and do not re-converge, along the at least the portion of the container.

2. The system of claim 1, wherein the container is further bound by a door that is opposite of and parallel to the third upright wall.

3. The system of claim 1, wherein the three-dimensional image is captured over a field of view (FOV) that does not extend outside of an interior of the container.

4. The system of claim 1, wherein the basing the first fullness at least in part on the average depth value includes comparing the average value against a plurality of depth values each associated with a respective level of first fullness of the container.

5. The system of claim 4, wherein the each of the respective level of first fullness of the container is dependent on at least one of a height, a width, and a depth of the container.

6. The system of claim 1, wherein the basing the first fullness at least in part on the average depth value includes comparing the average depth value against a first plurality of depth values each associated with a respective level of first fullness of the container.

7. The system of claim 6, wherein the basing the utilization of the container at least in part on the furthest distance value includes comparing the furthest distance value against a second plurality of distance values each associated with a respective level of utilization of the container.

8. The system of claim 6, wherein the basing the utilization of the container at least in part on the furthest distance value includes converting the furthest distance value into a percentage of a depth of the container and subtracting the percentage from 100%.

9. A container monitoring unit (CMU) for analyzing capacity of a container, comprising:
   a housing;
   an imaging assembly at least partially within the housing and operable to capture a three-dimensional image representative of a three-dimensional formation, the three-dimensional image having a plurality of points with three-dimensional point data including depth data; and
   a CMU controller communicatively connected to the imaging assembly, the controller operable to:
      generate a histogram of the depth data from at least a portion of the three-dimensional point data;
      estimate a fullness of the container, based at least in part on the histogram, via a histogram average-based calculation and via a histogram peak-based calculation;
      provide an indication of mixed loading when, upon the container being loaded, the fullness of the container estimated via the histogram average-based calculation and the fullness of the container estimated via the histogram peak-based calculation diverge and converge, along at least a portion of the container, and
      provide an indication of no mixed loading when, upon the container being loaded, the fullness of the container estimated via the histogram average-based calculation and the fullness of the container estimated via the histogram peak-based calculation diverge and do not re-converge, along at least a portion of the container.

10. The CMU of claim 9, wherein the histogram average-based calculation includes computing an average depth value from the histogram and comparing the average value against a plurality of depth values each associated with a respective level of fullness of the container.

11. The CMU of claim 9, wherein the histogram average-based calculation includes computing an average depth value from the histogram and basing the fullness of the container estimated via the histogram average-based calculation at least in part on the average depth value from the histogram, and
   wherein histogram peak-based calculation includes by identifying a first plurality of histogram peaks falling within a threshold percentage of a highest histogram peak, identifying a peak from the first plurality of histogram peaks having a furthest distance value from the CMU, and basing the fullness of the container estimated via the histogram peak-based calculation at least in part on the furthest distance value.

* * * * *